US011221822B2

(12) United States Patent
Zhang et al.

(10) Patent No.: US 11,221,822 B2
(45) Date of Patent: Jan. 11, 2022

(54) METHOD AND APPARATUS FOR CONTROLLING PAGE

(71) Applicant: Baidu Online Network Technology (Beijing) Co., Ltd., Beijing (CN)

(72) Inventors: Yan Zhang, Beijing (CN); Binyuan Du, Beijing (CN); Fei Wang, Beijing (CN); Jing Li, Beijing (CN); Gaofei Cheng, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 42 days.

(21) Appl. No.: 15/857,025

(22) Filed: Dec. 28, 2017

(65) Prior Publication Data

US 2019/0147861 A1    May 16, 2019

(30) Foreign Application Priority Data

Nov. 15, 2017  (CN) .......................... 201711126816.9

(51) Int. Cl.
*G06F 3/16* (2006.01)
*G10L 15/22* (2006.01)
(Continued)

(52) U.S. Cl.
CPC .............. *G06F 3/167* (2013.01); *G10L 15/22* (2013.01); *G10L 15/26* (2013.01); *G10L 15/30* (2013.01);
(Continued)

(58) Field of Classification Search
CPC ....... G10L 15/22; G10L 15/187; G10L 15/30; G10L 2015/223; G10L 25/51; G10L 15/26; G06F 3/167; G06F 40/14
See application file for complete search history.

(56) References Cited

U.S. PATENT DOCUMENTS 10,931,713 B1 *   2/2021   Allam ................... H04L 9/3247
2008/0104056 A1 * 5/2008   Li ........................ G06Q 10/063
(Continued)

FOREIGN PATENT DOCUMENTS

CN    101188109 A    5/2008
CN    101376226 A    3/2009
(Continued)

OTHER PUBLICATIONS

Machine English Translation of WO-2017028601-A1 (Year: 2017).*

*Primary Examiner* — Michelle M Koeth
(74) *Attorney, Agent, or Firm* — Seed IP Law Group LLP

(57) ABSTRACT

Embodiments of the present disclosure disclose a method and apparatus for controlling a page. A specific embodiment of the method comprises: receiving voice information from a terminal and element information of at least one element in a displayed page; performing voice recognition on the voice information to acquire a voice recognition result, in response to determining the voice information being used for controlling the displayed page; matching the voice recognition result with the element content information of the at least one element; and generating page control information in response to determining successfully matching the voice recognition result with the element content information of the at least one element, and sending the page control information to the terminal to allow the terminal to control the displayed page based on the page control information.

12 Claims, 5 Drawing Sheets

(51) Int. Cl.
  *G10L 25/51* (2013.01)
  *G10L 15/30* (2013.01)
  *G10L 15/26* (2006.01)
  *G10L 15/187* (2013.01)
  *G06F 40/14* (2020.01)

(52) U.S. Cl.
  CPC .............. *G10L 25/51* (2013.01); *G06F 40/14* (2020.01); *G10L 15/187* (2013.01); *G10L 2015/223* (2013.01)

(56) References Cited

U.S. PATENT DOCUMENTS

| | | | | |
|---|---|---|---|---|
| 2008/0228494 A1* | 9/2008 | Cross | .................... | G10L 15/22 704/275 |
| 2013/0014002 A1* | 1/2013 | Cai | ........................ | G06F 16/80 715/234 |
| 2014/0092904 A1* | 4/2014 | Martin | .................... | H04W 4/18 370/392 |
| 2017/0068670 A1* | 3/2017 | Orr | ......................... | G06F 3/048 |

FOREIGN PATENT DOCUMENTS

| | | | |
|---|---|---|---|
| CN | 102829930 A | 12/2012 | |
| CN | 103106900 A | 5/2013 | |
| CN | 103474068 A | 12/2013 | |
| CN | 103914219 A | 7/2014 | |
| CN | 105161106 A | 12/2015 | |
| CN | 105224198 A | 1/2016 | |
| CN | 105869640 A | 8/2016 | |
| CN | 106792242 A | 5/2017 | |
| WO | WO-2017028601 A * | 2/2017 | ............. G10L 15/26 |

\* cited by examiner

METHOD AND APPARATUS FOR CONTROLLING PAGE

CROSS-REFERENCE TO RELATED APPLICATION

This application is related to and claims priority from Chinese Application No. 201711126816.9, filed on Nov. 15, 2017 and entitled "Method and Apparatus for Controlling Page", the entire disclosure of which is hereby incorporated by reference.

TECHNICAL FIELD

Embodiments of the present disclosure relate to the field of computer technology, in particular to the field of Internet technology, especially to a method and apparatus for controlling a page.

BACKGROUND

With the rapid development of the voice recognition technology, voice control has been gradually applied to various terminal devices, and users may control the terminal devices by voice. For example, users may control by voice the contents displayed on smart terminals such as smart televisions and smartphones. At present, to control an APP (application) in a smart terminal by voice, the to-be-controlled APP needs to provide a call interface to the outside for the purpose of being controlled. Alternatively, the to-be-controlled APP needs to pre-integrate a communication SDK (Software Development Kit) mechanism and implements a function that needs to be controlled by voice according to the SDK modus, so that the APP can be controlled, thereby largely limiting the application scope of the voice control.

SUMMARY

Embodiments of the present disclosure provide a method and apparatus for controlling a page.

In a first aspect, an embodiment of the present disclosure provides a method for controlling a page, comprising: receiving voice information from a terminal and element information of at least one element in a displayed page, the element information comprising an element identifier and element content information; performing voice recognition on the voice information to acquire a voice recognition result, in response to determining the voice information being used for controlling the displayed page; matching the voice recognition result with the element content information of the at least one element; and generating page control information in response to determining successfully matching the voice recognition result with the element content information of the at least one element, and sending the page control information to the terminal to allow the terminal to control the displayed page based on the page control information, the page control information comprising a to-be-executed operation and an element identifier of a target element, the target element being an aimed element of the to-be-executed operation.

In some embodiments, the matching the voice recognition result with the element content information of the at least one element comprises: calculating, for element content information of each element among the at least one element, a similarity between the voice recognition result and the element content information of the element, and determining successfully matching of the voice recognition result with the element based on the calculated similarity.

In some embodiments, the calculating a similarity between the voice recognition result and the element content information of the element, and determining successfully matching of the voice recognition result with the element based on the calculated similarity comprises: calculating a first edit distance between the voice recognition result and the element content information of the element; determining whether the first edit distance is greater than a preset first threshold; and determining the successfully matching the voice recognition result with the element content information of the element in response to determining the first edit distance being not greater than the first threshold.

In some embodiments, the calculating a similarity between the voice recognition result and the element content information of the element, and determining successfully matching of the voice recognition result with the element based on the calculated similarity further comprises: calculating a second edit distance between a pronunciation corresponding to the voice recognition result and a pronunciation corresponding to the element content information of the element in response to determining the first edit distance being greater than the first threshold; determining whether the second edit distance is greater than a preset second threshold; determining the successfully matching the voice recognition result with the element in response to determining the second edit distance being not greater than the second threshold; and determining unsuccessfully matching the voice recognition result with the element in response to determining the second edit distance being greater than the second threshold.

In some embodiments, the element information further comprises at least one of the followings: position information of an element on the displayed page, an application name of an application corresponding to the displayed page and a version number of the application corresponding to the displayed page.

In some embodiments, the element information of the at least one element is stored in a tree structure; and the matching the voice recognition result with the element content information of the at least one element comprises: traversing each subnode of the tree structure; and matching the element content information of the element represented by the each subnode and the voice recognition result.

In some embodiments, the to-be-executed operation is a click operation.

In a second aspect, an embodiment of the present disclosure provides a method for controlling a page, comprising: sending, in response to receiving voice information from a user, the voice information and element information of at least one element in a displayed page to a server, the element information comprising an element identifier and element content information; receiving page control information from the server, the page control information being generated after the server determines the voice information being used for controlling the displayed page, the page control information comprising a to-be-executed operation and an element identifier of a target element, and the target element being an aimed element of the to-be-executed operation; and determining a position of the target element on the displayed page based on the element identifier of the target element, and executing the to-be-executed operation in the determined position.

In a third aspect, an embodiment of the present disclosure provides an apparatus for controlling a page, comprising: a receiving unit, configured for receiving voice information from a terminal and element information of at least one element in a displayed page, the element information comprising an element identifier and element content information; a recognition unit, configured for performing voice recognition on the voice information to acquire a voice recognition result, in response to determining the voice information being used for controlling the displayed page; a matching unit, configured for matching the voice recognition result with the element content information of the at least one element; and a generation unit, configured for generating page control information in response to determining successfully matching the voice recognition result with the element content information of the at least one element, and sending the page control information to the terminal to allow the terminal to control the displayed page based on the page control information, the page control information comprising a to-be-executed operation and an element identifier of a target element, the target element being an aimed element of the to-be-executed operation.

In some embodiments, the matching unit comprises a calculation unit, the calculation unit being configured for calculating, for element content information of each element among the at least one element, a similarity between the voice recognition result and the element content information of the element, and determining successfully matching of the voice recognition result with the element based on the calculated similarity.

In some embodiments, the calculation unit comprises a first calculation subunit, the first calculation subunit being configured for: calculating a first edit distance between the voice recognition result and the element content information of the element; determining whether the first edit distance is greater than a preset first threshold; and determining the successfully matching the voice recognition result with the element content information of the element in response to determining the first edit distance being not greater than the first threshold.

In some embodiments, the calculation unit further comprises a second calculation subunit, the second calculation subunit being configured for: calculating a second edit distance between a pronunciation corresponding to the voice recognition result and a pronunciation corresponding to the element content information of the element in response to determining the first edit distance being greater than the first threshold; determining whether the second edit distance is greater than a preset second threshold; determining the successfully matching the voice recognition result with the element in response to determining the second edit distance being not greater than the second threshold; and determining unsuccessfully matching the voice recognition result with the element in response to determining the second edit distance being greater than the second threshold.

In some embodiments, the element information further comprises at least one of the followings: a position information of an element on the displayed page, an application name of an application corresponding to the displayed page and a version number of the application corresponding to the displayed page.

In some embodiments, the element information of the at least one element is stored in a tree structure; and the matching unit is further configured for traversing each subnode of the tree structure; and matching the element content information of the element represented by the each subnode and the voice recognition result.

In some embodiments, the to-be-executed operation is a click operation.

In a fourth aspect, an embodiment of the present disclosure provides an apparatus for controlling a page, comprising: a sending unit, configured for sending, in response to receiving voice information from a user, the voice information and element information of at least one element in a displayed page to a server, the element information comprising an element identifier and element content information; an information receiving unit, configured for receiving page control information from the server, the page control information being generated after the server determines the voice information being used for controlling the displayed page, the page control information comprising a to-be-executed operation and an element identifier of a target element, and the target element being an aimed element of the to-be-executed operation; and an execution unit, configured for determining a position of the target element on the displayed page based on the element identifier of the target element, and executing the to-be-executed operation in the determined position.

In a fifth aspect, an embodiment of the present disclosure provides a server, comprising: one or more processors; and a storage device, configured for storing one or more programs, the one or more programs, when being executed by the one or more processors, cause the one or more processors to perform the method as described in any embodiment in the first aspect.

In a sixth aspect, an embodiment of the present disclosure provides a computer readable storage medium storing a computer program, wherein the program, when executed by a processor, cause the processor to perform the method as described in any embodiment in the first aspect.

In a seventh aspect, an embodiment of the present disclosure provides a terminal, comprising: one or more processors; and a storage device, configured for storing one or more programs, the one or more programs, when being executed by the one or more processors, cause the one or more processors to perform the method as described in the second aspect.

In an eighth aspect, an embodiment of the present disclosure provides a computer readable storage medium storing a computer program, wherein the program, when executed by a processor, cause the processor to perform the method as described in the second aspect.

The page control method and apparatus provided by embodiments of the present disclosure effectively use an element information of an element in a displayed page and realize voice control on the displayed page by: receiving a voice information from a terminal and an element information of at least one element in a displayed page; performing voice recognition on the voice information in response to the determination that the voice information is used for controlling the displayed page so as to acquire a voice recognition result; matching the voice recognition result and the element content information of the at least one element; and generating a page control information in response to the determination of the successful matching between the voice recognition result and the element content information of the at least one element, and sending the page control information to the terminal to allow the terminal to control the displayed page according to the page control information.

BRIEF DESCRIPTION OF THE DRAWINGS

Other features, objects and advantages of the present disclosure will become more apparent by reading the detailed description about the non-limiting embodiments with reference to the following drawings.

DETAILED DESCRIPTION OF EMBODIMENTS

The present disclosure will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present disclosure and the features in the embodiments may be combined with each other on a non-conflict basis. The present disclosure will be described below in detail with reference to the accompanying drawings and in combination with the embodiments.

Figure 1:
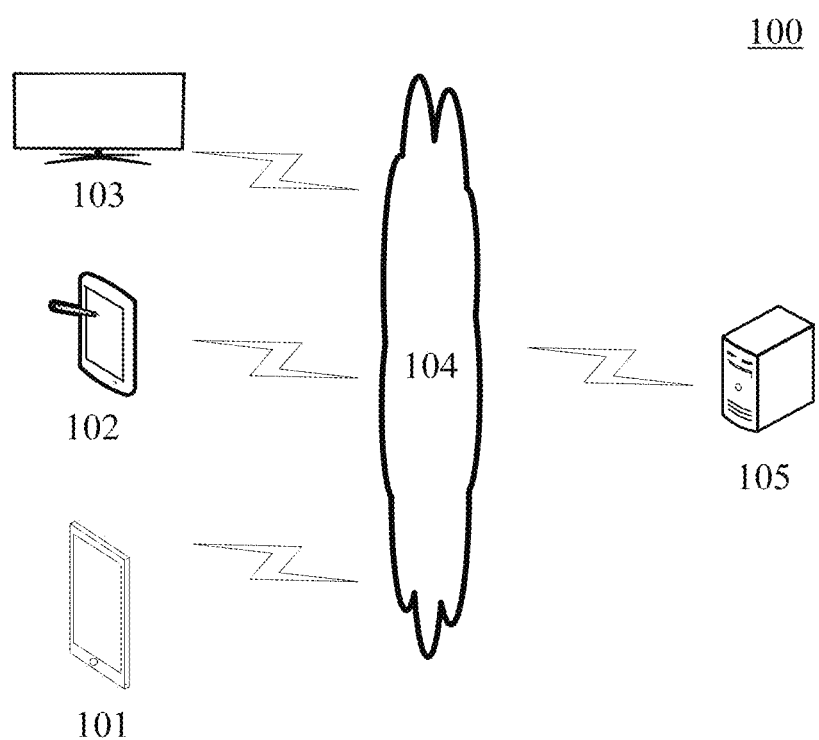
FIG. 1 is an exemplary system architecture to which the present disclosure may be applied.

FIG. 1 shows an exemplary architecture of a system 100 which may be used by a method or apparatus for controlling a page according to the embodiments of the present disclosure.

As shown in FIG. 1, the system architecture 100 may include terminal devices 101, 102 and 103, a network 104 and a server 105. The network 104 serves as a medium providing a communication link between the terminal devices 101, 102 and 103 and the server 105. The network 104 may include various types of connections, such as wired or wireless transmission links, or optical fibers.

A user may interact with a server 105 over the network 104 using terminal devices 101, 102 and 103 to receive or send a message. Various client applications such as web browser applications, shopping applications, search applications, instant communication tools, email clients and social platform software may be installed on the terminal devices 101, 102 and 103. A voice application such as a voice assistant may also be installed on the terminal devices 101, 102 and 103. The user may input voice by means of the voice assistant.

The terminal devices 101, 102 and 103 may be various electronic devices having display screens and supporting webpage browsing, including but not limited to smartphones, tablets, smart televisions and e-book readers.

The server 105 may be a server that provides various services, for example, a background server that provides support for a page displayed in the terminal devices 101, 102 and 103. The background server may analyze a received voice information and element information of at least one element in a page displayed in the terminal device, and feed back a processing result (for example, a page control information) to the terminal device.

Figure 2:
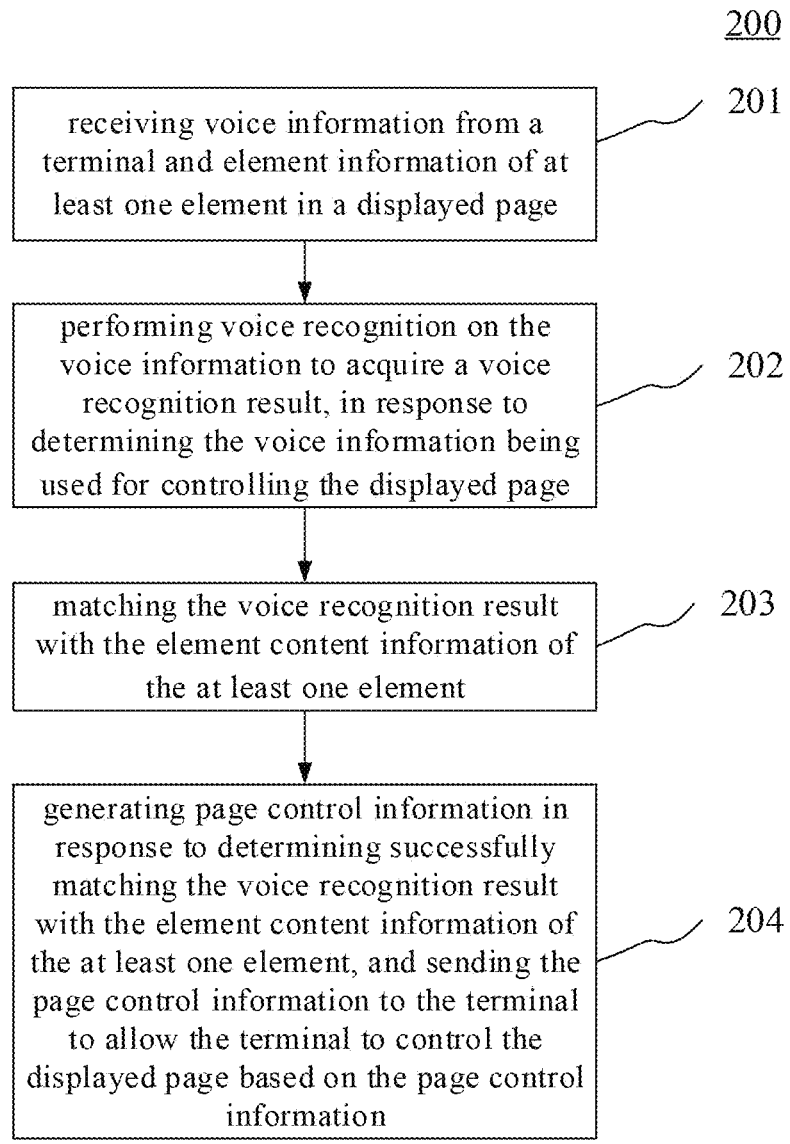
FIG. 2 is a flowchart of an embodiment of a page control method according to the present disclosure.
Figure 4:
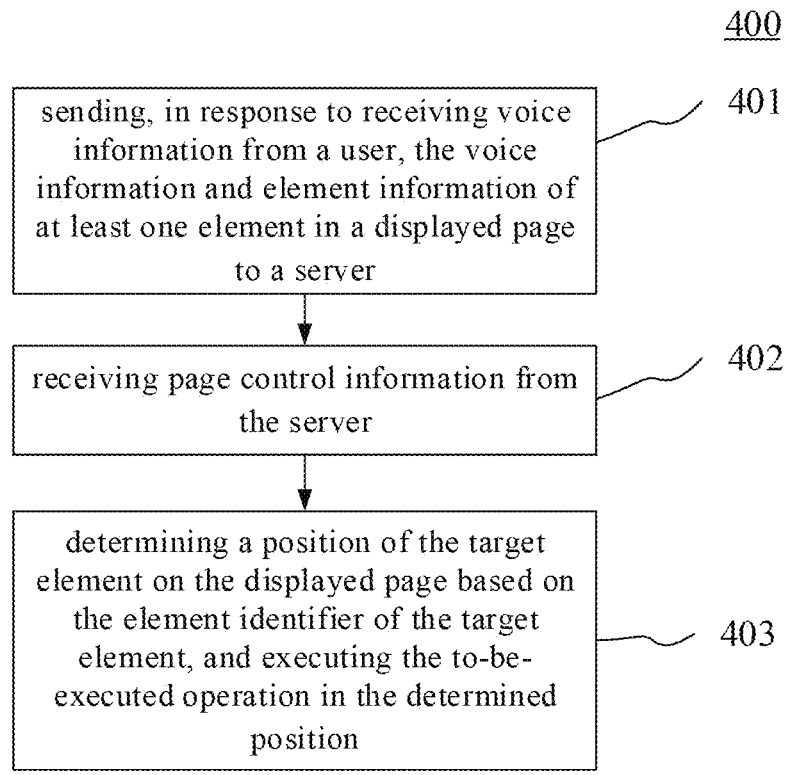
FIG. 4 is a flowchart of another embodiment of a page control method according to the present disclosure.
Figure 5:
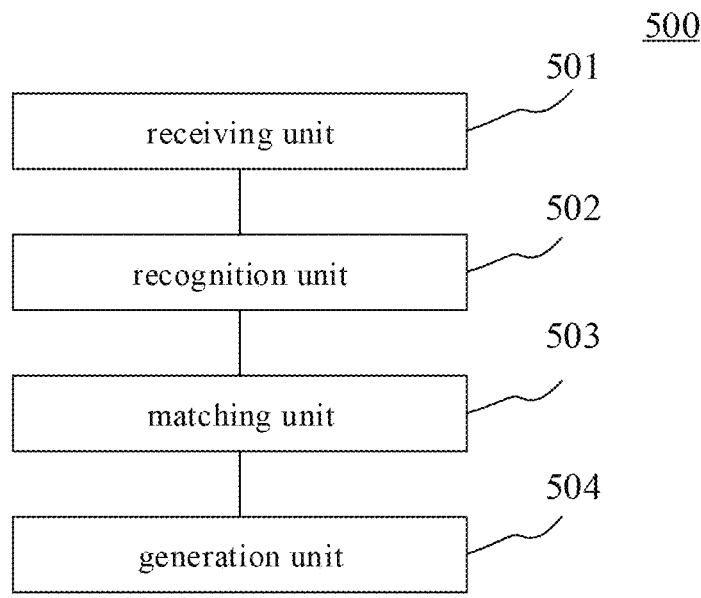
FIG. 5 is a structural diagram of an embodiment of a page control method according to the present disclosure.
Figure 6:
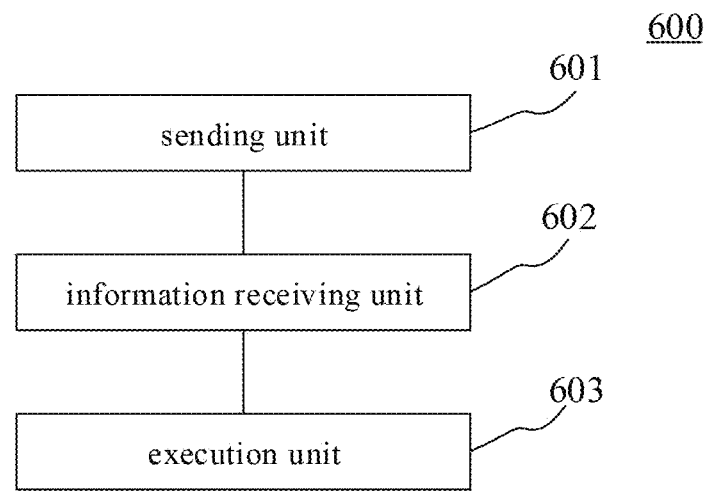
FIG. 6 is a structural diagram of another embodiment of a page control method according to the present disclosure.

It should be noted that the page control method as provided by an embodiment corresponding to FIG. 2 of the present disclosure is generally executed by the server 105. Correspondingly, the page control apparatus in FIG. 5 is generally disposed in the server 105. The page control method as provided by an embodiment corresponding to FIG. 4 is generally executed by the terminal devices 101, 102 and 103. Correspondingly, the page control apparatus in FIG. 6 is generally disposed in the terminal devices 101, 102 and 103, which is not limited in the present disclosure.

It should be understood that the numbers of terminal devices, networks, and servers in FIG. 1 are merely illustrative. There may be any number of terminal devices, networks and servers, depending on the implementation needs.

Referring further to FIG. 2, a flow 200 of one embodiment of a page control method according to the present disclosure is shown. The page control method comprises the following steps:

Step 201: receiving voice information from a terminal and element information of at least one element in a displayed page.

In the present embodiment, an electronic device (for example, the server 105 as shown in FIG. 1) to which a page control method is applied may receive voice information from a terminal used by a user for page presentation and element information of at least one element of a displayed page by means of a wired connection or wireless connection mean, the displayed page may refer to a page displayed in the terminal when the user sends the voice information, wherein the displayed page may comprise at least one element (for example, text and image), wherein the element information of each element may comprise an element identifier and element content information, wherein the element identifier may be used to uniquely identify an element in one page. The element content information may be used to describe an element content. For example, when an element is a text, the element content information may be the text itself. Also for example, when the element is an image, the element content information may be a descriptive information of an object displayed in the image. An object displayed in an image, for instance, is a filmstrip or a film projector, the element content information of the image may be film, video and the like. It should be noted that the wireless connection means above may comprise but not limited to a 3G/4G connection, a WiFi connection, a Bluetooth connection, a WiMAX connection, a Zigbee connection, a UWB (ultra wideband) connection and other wireless connection means that is known now or is to be developed in future.

In some optional implementations of the present embodiment, the element information may further comprise at least one of the followings: position information of an element on the displayed page, an application name of an application corresponding to the displayed page and a version number of the application corresponding to the displayed page.

Step 202: performing voice recognition on the voice information to acquire a voice recognition result, in response to determining the voice information being used for controlling the displayed page.

In the present embodiment, the electronic device may perform various analysis (for example, natural language processing and intent recognition) on the voice information received in step 201 to determine whether the voice information is used for controlling the displayed page, and perform voice recognition on the voice information in response to the determination that the voice information is used for controlling the displayed page so as to acquire a voice recognition result.

It should be noted that various voice recognition methods are prior arts that are widely studied and applied at present and will not be described in detail herein.

Step 203: matching the voice recognition result with the element content information of the at least one element.

In the present embodiment, the electronic device may match the voice recognition result and the element content information of the at least one element. As an example, the electronic device may, for element content information of each element among the at least one element, compare the voice recognition result with element content information of the element. If the voice recognition result is the same as the element content information of the element or if the voice recognition result contains the element content information of the element, it may be determined that the voice recognition result matches the element content information of the element.

In some optional implementations of the present embodiment, the element information of the at least one element is stored in a tree structure; and the step 203 of matching the voice recognition result with the element content information of the at least one element may specifically comprise: traversing each subnode of the tree structure; and then, matching the element content information of the element represented by the each subnode and the voice recognition result.

In some optional implementations of the present embodiment, the step 203 may specifically comprise: calculating, by the electronic device for element content information of each element among the at least one element, a similarity between the voice recognition result and the element content information of the element (for example, cosine similarity, Jaccard similarity coefficient, Euclidean distance) and determining whether the voice recognition result is successfully matched with the element according to the calculated similarity. As an example, an element that has the highest similarity to the voice recognition result among the at least one element may be selected as the element that matches successfully.

In some optional implementations, the calculating a similarity between the voice recognition result and the element content information of the element and determining whether the voice recognition result is successfully matched with the element according to the calculated similarity may specifically comprises: first calculating, by the electronic device, a first edit distance between the voice recognition result and the element content information of the element; and then determining, by the electronic device, whether the first edit distance is greater than a preset first threshold, the first threshold herein being a threshold preset according to the actual demands; and lastly, determining the successfully matching the voice recognition result with the element content information of the element in response to determining the first edit distance being not greater than the first threshold. As an example, when the voice recognition result matches the element content information of two or more elements among the at least one element successfully, an element having the smallest first edit distance from the voice recognition result is selected as the element that matches successfully.

Optionally, the calculating a similarity between the voice recognition result and the element content information of the element and determining whether the voice recognition result is successfully matched with the element according to the calculated similarity may also specifically comprises: calculating, by the electronic device, a second edit distance between a pronunciation corresponding to the voice recognition result and a pronunciation corresponding to the element content information of the element in response to determining the first edit distance being greater than the first threshold; secondly, determining whether the second edit distance is greater than a preset second threshold, the second threshold here being a threshold preset according to actual needs; then, determining, by the electronic device, the successfully matching the voice recognition result with the element in response to determining the second edit distance being not greater than the second threshold; and finally, determining, by the electronic device, unsuccessfully matching the voice recognition result with the element in response to determining the second edit distance being greater than the second threshold. In the present implementation, calculating a second edit distance between a pronunciation corresponding to the voice recognition result and a pronunciation corresponding to the element content information of the element may reduce the interference from phenomena such as a word having multiple pronunciations and different words having the same pronunciation, thereby resulting in a more accurate matching result.

It should be noted that the method for obtaining pronunciations corresponding to the voice recognition result and the element content information is a prior art that is widely studied and applied at present and will not be described herein again.

Step 204: generating page control information in response to determining successfully matching the voice recognition result with the element content information of the at least one element, and sending the page control information to the terminal to allow the terminal to control the displayed page based on the page control information.

In the present embodiment, in response to the determination of the successful matching between the voice recognition result and element content information of an element in the element content information of the at least one element, the electronic device may generate a page control information and send the generated page control information to the terminal so as to allow the terminal to control the displayed page according to the page control information. The page control information herein may comprise an operation to be executed and an element identifier of a target element, and the target element is a target at which the operation to be executed aims.

In some optional implementations of the present embodiment, the to-be-executed operation is a click operation.

Figure 3A:
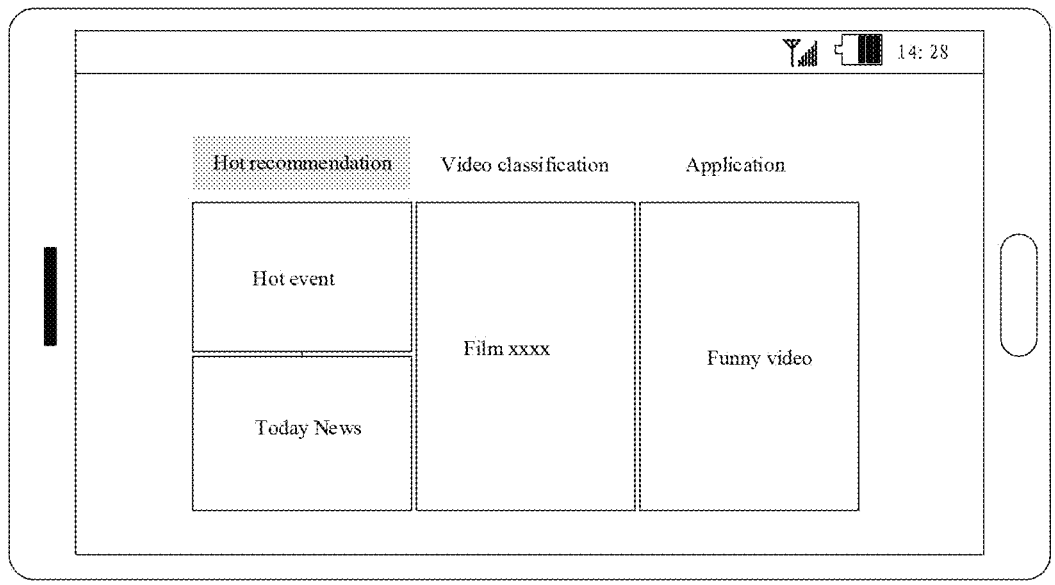
FIG. 3a and FIG. 3b are schematic diagrams of an application scenario of a page control method according to the present disclosure.
Figure 3B:
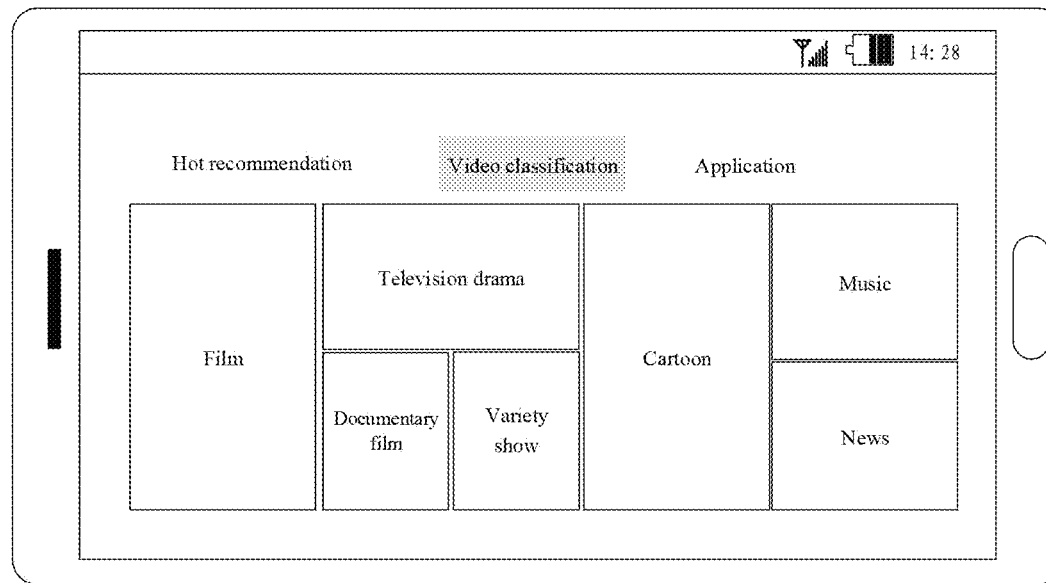

Referring further to FIG. 3a and FIG. 3b, FIG. 3a and FIG. 3b are schematic diagrams of application scenarios of a page control method according to the present embodiment. In the application scenarios of FIG. 3a and FIG. 3b, a page displayed in a smart terminal at the current moment is shown in FIG. 3a. At this moment, an element "Hot recommendation" is checked, and a content corresponding to the "Hot recommendation" is displayed in the displayed page. A user sends voice information "Video classification" to the smart terminal, and the smart terminal sends the voice information and element information of at least one element in the displayed page in FIG. 3a to a server; afterwards, the server, in response to the determination that the voice information is used for controlling the displayed page in FIG. 3a, performs voice recognition on the voice information to obtain a voice recognition text "Video classification"; and then, the server matches the voice recognition text "Video classification" with the element content information of at least one element in the displayed page in FIG. 3a; and finally, in response to the determination of the successful matching between the voice recognition text "Video classification" and the element content information of the element "Video classification" in the displayed page in FIG. 3a, the server may generate a page control information and send the generated page control information to the smart terminal, and the page control information may comprise an operation to be executed and an element identifier of a target element. In the present application scenario, the operation to be executed is a click, and the target element is the element "Video classification". The smart terminal may, according to the received page control information, perform a simulated click on the element "Video classification" in the displayed page in FIG. 3a so as to control the page change not to change. As shown in FIG. 3b, the element "Video classification" in FIG. 3b is selected, and the page displays the a content corresponding to the "Video classification".

The method provided in the embodiment above of the present disclosure effectively uses the element information of the element in the displayed page and realizes voice control on the displayed page. In addition, the method provided by the embodiment above may implement voice control on the displayed page without additional development of an APP corresponding to the displayed page, thereby largely expanding the scope of voice control.

With further reference to FIG. 4, a flow 400 of another embodiment of a page control method is shown. The flow 400 of the page control method comprises the following steps:

Step 401, sending, in response to receiving voice information from a user, the voice information and element information of at least one element in a displayed page to a server.

In the present embodiment, an electronic device (for example, the terminal devices 101, 102 and 103 as shown in FIG. 1) on which the page control method is applied may receive voice information from a user directly or by means of other voice receiving device (such as a microphone, an intelligent remote controller), and send the received voice information and element information of at least one element in the displayed page to a server. Wherein, the displayed page may refer to a page displayed in the electronic device at the moment when the user sends the voice information, and the displayed page may comprise at least one element (such as a text and an image). Wherein, the element information of each element may comprise an element identifier and element content information, wherein the element identifier may be used for uniquely identifying an element in a page. Element content information may be used to describe an element content. For example, when an element is a text, the element content information may be the text itself. Also for example, when the element is an image, the element content information may be a descriptive information of an object displayed in the image. If an object displayed in an image, for instance, is a filmstrip or a film projector, the element content information of the image may be film, movie and the like. Optionally, the element information of the at least one element in the displayed page may be stored in a tree structure in the electronic device. In addition, the element information of the element may further comprise at least one of the following: position information of an element in the displayed page, an application name of an application corresponding to the displayed page and a version number of the application corresponding to the displayed page.

Step 402: receiving page control information from the server.

In the present embodiment, the electronic device may further receive a page control information from the server, the page control information may be generated after the server determines that the voice information is used for controlling the displayed page, and the page control information may comprise an operation to be executed and an element identifier of a target element, the target element being a target at which the operation to be executed aims.

Step 403: determining a position of the target element on the displayed page based on the element identifier of the target element, and executing the to-be-executed operation in the determined position.

In the present embodiment, the electronic device may determine a position of the target element in the displayed page according to the element identifier of the target element, and execute the operation to be executed in the determined position. As an example, when the operation to be executed is a click, the electronic device may perform a simulated click in a position determined according to the element identifier of the target element so as to control the displayed page.

In the present embodiment, a page control method effectively uses element information of an element in a displayed page and realizes voice control on the displayed page by: first sending voice information and element information of at least one element in a displayed page to a server, and then receiving a page control information from the server and executing an operation to be executed in the displayed page according to the page control information.

With further reference to FIG. 5, the present disclosure provides an embodiment of a page control apparatus, the apparatus embodiment corresponds to the method embodiment as shown in FIG. 2, and the apparatus may specifically be applied in a variety of electronic devices.

As shown in FIG. 5, a page control apparatus 500 according to the present embodiment comprises a receiving unit 501, a recognition unit 502, a matching unit 503 and a generation unit 504. The receiving unit 501 is configured for receiving voice information from a terminal and element information of at least one element in a displayed page, the element information comprising an element identifier and element content information; the recognition unit 502 is configured for performing voice recognition on the voice information to acquire a voice recognition result, in response to determining the voice information being used for controlling the displayed page; the matching unit 503 is configured for matching the voice recognition result with the element content information of the at least one element; and the generation unit 504 is configured for generating page control information in response to determining successfully matching the voice recognition result with the element content information of the at least one element, and sending the page control information to the terminal to allow the terminal to control the displayed page based on the page control information, the page control information comprising a to-be-executed operation and an element identifier of a target element, the target element being an aimed element of the to-be-executed operation.

In the present embodiment, the specific processing of the receiving unit 501, the recognition unit 502, the matching unit 503 and the generation unit 504 of the page control apparatus 500 and the technical effects thereof may refer to the step 201, step 202, step 203 and step 204 in the corresponding embodiments in FIG. 2 and will not be described herein again.

In some optional implementations of the present embodiment, the matching unit 503 comprises a calculation unit (not shown in the figure), the calculation unit being configured for calculating, for element content information of each element among the at least one element, a similarity between the voice recognition result and the element content information of the element, and determining successfully matching of the voice recognition result with the element based on the calculated similarity.

In some optional implementations of the present embodiment, the calculation unit may comprise a first calculation subunit (not shown in the figure), the first calculation subunit being configured for: calculating a first edit distance between the voice recognition result and the element content information of the element; determining whether the first edit distance is greater than a preset first threshold; and determining the successfully matching the voice recognition result with the element content information of the element in response to determining the first edit distance being not greater than the first threshold.

In some optional implementations of the present embodiment, the calculation unit further comprises a second calculation subunit, the second calculation subunit (not shown in the figure) being configured for: calculating a second edit distance between a pronunciation corresponding to the voice recognition result and a pronunciation corresponding to the element content information of the element in response to determining the first edit distance being greater than the first threshold; determining whether the second edit distance is greater than a preset second threshold; determining the successfully matching the voice recognition result with the element in response to determining the second edit distance being not greater than the second threshold; and determining unsuccessfully matching the voice recognition result with the element in response to determining the second edit distance being greater than the second threshold.

In some optional implementations of the present embodiment, the element information may further comprise at least one of the followings: position information of an element on the displayed page, an application name of an application corresponding to the displayed page and a version number of the application corresponding to the displayed page.

In some optional implementations of the present embodiment, the element information of the at least one element is stored in a tree structure; and the matching unit 503 may be further configured for traversing each subnode of the tree structure; and matching the element content information of the element represented by the each subnode and the voice recognition result.

In some optional implementations of the present embodiment, the to-be-executed operation is a click operation.

With further reference to FIG. 6, the present disclosure provides an embodiment of a page control apparatus, the apparatus embodiment corresponds to the method embodiment as shown in FIG. 4, and the apparatus may specifically be applied in a variety of electronic devices.

As shown in FIG. 6, a page control apparatus 600 according to the present embodiment comprises: a sending unit 601, an information receiving unit 602 and an execution unit 603. The sending unit 601 is configured for sending, in response to receiving voice information from a user, the voice information and element information of at least one element in a displayed page to a server, the element information comprising an element identifier and element content information; the information receiving unit 602 is configured for receiving page control information from the server, the page control information being generated after the server determines the voice information being used for controlling the displayed page, the page control information comprising a to-be-executed operation and an element identifier of a target element, and the target element being an aimed element of the to-be-executed operation; and the execution unit 603 is configured for determining a position of the target element on the displayed page based on the element identifier of the target element, and executing the to-be-executed operation in the determined position.

In the present embodiment, the specific processing of the sending unit 601, the information receiving unit 602 and the execution unit 603 of the page control apparatus 600 and the technical effects thereof may refer to the step 401, step 402 and step 403 in the corresponding embodiments in FIG. 4 and will not be described herein again.

Figure 7:
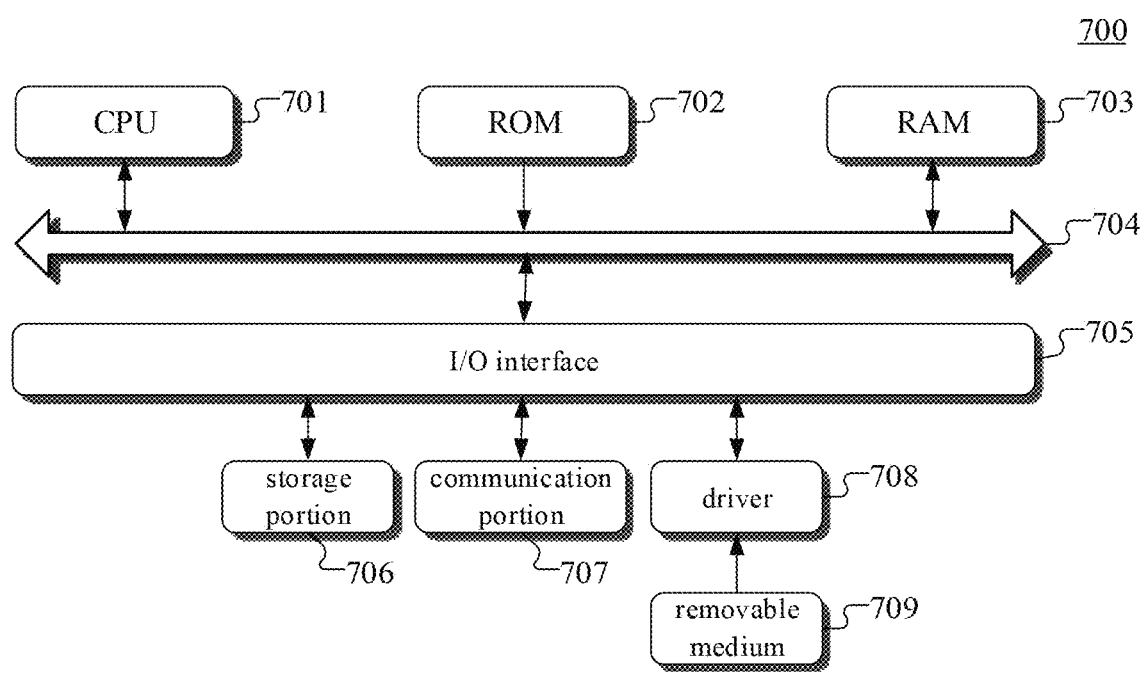
FIG. 7 is structural diagram of a computer system for realizing a server according to an embodiment of the present disclosure.

FIG. 7 is a structural diagram of a computer system 600 suitable for implementing a server according to an embodiment of the present disclosure. The server shown in FIG. 7 is merely an example, and shall not impose any limitation on the function and the scope of use of the present embodiment of the present disclosure.

As shown in FIG. 7, the computer system 700 includes a central processing unit (CPU) 701, which may execute various appropriate actions and processes in accordance with a program stored in a read-only memory (ROM) 702 or a program loaded into a random access memory (RAM) 703 from a storage portion 706. The RAM 703 also stores various programs and data required by operations of the system 700. The CPU 701, the ROM 702 and the RAM 703 are connected to each other through a bus 704. An input/output (I/O) interface 705 is also connected to the bus 704.

The following components are connected to the I/O interface 705: a storage portion 706 including a hard disk etc.; and a communication portion 707 comprising a network interface card, such as a LAN card and a modem. The communication portion 707 performs communication processes via a network, such as the Internet. A driver 708 is also connected to the I/O interface 705 as required. A removable medium 709, such as a magnetic disk, an optical disk, a magneto-optical disk, and a semiconductor memory, may be installed on the driver 708, to facilitate the installation of a computer program therefrom on the storage portion 706 as needed.

In particular, according to embodiments of the present disclosure, the process described above with reference to the flow chart may be implemented in a computer software program. For example, an embodiment of the present disclosure includes a computer program product, which comprises a computer program that is tangibly embedded in a machine-readable medium. The computer program comprises program codes for executing the method as illustrated in the flow chart. In such an embodiment, the computer program may be downloaded and installed from a network via the communication portion 707, and/or may be installed from the removable media 709. The computer program, when executed by the central processing unit (CPU) 701, implements the above mentioned functionalities as defined by the methods of the present disclosure. It should be noted that the computer readable medium in the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In the present disclosure, the computer readable storage medium may be any physical medium containing or storing programs which can be used by a command execution system, apparatus or element or incorporated thereto. In the present disclosure, the computer readable signal medium may include data signal in the base band or propagating as parts of a carrier, in which computer readable program codes are carried. The propagating signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units or modules involved in the embodiments of the present disclosure may be implemented by means of software or hardware. The described units or modules may also be provided in a processor, for example, described as: a processor, comprising a receiving unit, a recognition unit, a matching unit, and a generation unit, where the names of these units or modules do not in some cases constitute a limitation to such units or modules themselves. For example, the receiving unit may also be described as "a unit for receiving voice information from a terminal and element information of at least one element in a displayed page."

In another aspect, the present disclosure further provides a computer-readable storage medium. The computer-readable storage medium may be the computer storage medium included in the apparatus in the above described embodiments, or a stand-alone computer-readable storage medium not assembled into the apparatus. The computer-readable storage medium stores one or more programs. The one or more programs, when executed by a device, cause the device to: receive voice information from a terminal and element information of at least one element in a displayed page, the element information comprising an element identifier and element content information; perform voice recognition on the voice information to acquire a voice recognition result, in response to determining the voice information being used for controlling the displayed page; match the voice recognition result with the element content information of the at least one element; and generate page control information in response to determining successfully matching the voice recognition result with the element content information of the at least one element, and send the page control information to the terminal to allow the terminal to control the displayed page based on the page control information, the page control information comprising a to-be-executed operation and an element identifier of a target element, the target element being an aimed element of the to-be-executed operation.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present disclosure are examples.

What is claimed is:

1. A method for controlling a page, comprising:
    receiving, by a server, voice information and element information of at least one element in a displayed page simultaneously from a terminal, the displayed page being a page displayed on a screen of the terminal when the voice information is sent by the terminal, the element information comprising an element identifier, element content information, position information of an element on the displayed page, and a version number of an application corresponding to the displayed page;
    performing, by the server, voice recognition on the voice information to acquire a voice recognition result, in response to determining the voice information being used for controlling the displayed page;
    matching, by the server, the voice recognition result with the element content information of the at least one element in the displayed page; and
    generating, by the server, page control information based on at least the element information in response to determining successfully matching the voice recognition result with the element content information of the at least one element, and sending, by the server, the page control information to the terminal to allow the terminal to control the displayed page based on the page control information, the page control information comprising a click operation for the element with matched element content information in the displayed page, an element identifier of the element with the matched element content information and position information of the element with the matched element content information on the displayed page,
    wherein the element information of the at least one element is stored in a tree structure in the terminal, and
    the matching the voice recognition result with the element content information of the at least one element comprises:

traversing each subnode of the tree structure; and
matching the element content information of the element represented by the each subnode and the voice recognition result.

2. The method according to claim 1, wherein the matching the voice recognition result with the element content information of the at least one element comprises:
calculating, for element content information of each element among the at least one element, a similarity between the voice recognition result and the element content information of the element, and determining successfully matching of the voice recognition result with the element based on the calculated similarity.

3. The method according to claim 2, wherein the calculating a similarity between the voice recognition result and the element content information of the element, and determining successfully matching of the voice recognition result with the element based on the calculated similarity comprises:
calculating a first edit distance between the voice recognition result and the element content information of the element;
determining whether the first edit distance is greater than a preset first threshold; and
determining the successfully matching the voice recognition result with the element content information of the element in response to determining the first edit distance being not greater than the first threshold.

4. The method according to claim 3, wherein the calculating a similarity between the voice recognition result and the element content information of the element, and determining successfully matching of the voice recognition result with the element based on the calculated similarity further comprises:
calculating a second edit distance between a pronunciation corresponding to the voice recognition result and a pronunciation corresponding to the element content information of the element in response to determining the first edit distance being greater than the first threshold;
determining whether the second edit distance is greater than a preset second threshold;
determining the successfully matching the voice recognition result with the element in response to determining the second edit distance being not greater than the second threshold; and
determining unsuccessfully matching the voice recognition result with the element in response to determining the second edit distance being greater than the second threshold.

5. A method for controlling a page, applied to a terminal, comprising:
sending, in response to receiving voice information from a user, the voice information and element information of at least one element in a displayed page simultaneously to a server, the displayed page being a page displayed on a screen of the terminal, the element information comprising an element identifier, element content information, position information of an element on the displayed page, and a version number of an application corresponding to the displayed page;
receiving page control information from the server, the page control information being generated by the server based on at least the element information after the server determines the voice information being used for controlling the displayed page and a voice recognition result of the voice information matching the element content information of the at least one element in the displayed page, the page control information comprising a click operation for the element with matched element content information in the displayed page, an element identifier of the element with the matched element content information and position information of the element with the matched element content information on the displayed page; and
determining a position of the element with the matched element content information on the displayed page based on the element identifier of the element with the matched element content information and the position information of the element with the matched element content information, and executing the click operation in the determined position,
wherein the element information of the at least one element is stored in a tree structure in the terminal,
wherein the server matches the voice recognition result with the element content information of the at least one element by:
traversing each subnode of the tree structure; and
matching the element content information of the element represented by the each subnode and the voice recognition result.

6. An apparatus of a server for controlling a page, comprising:
at least one processor; and
a memory storing instructions, which when executed by the at least one processor, cause the at least one processor to perform operations, the operations comprising:
receiving voice information and element information of at least one element in a displayed page simultaneously from a terminal, the displayed page being a page displayed on a screen of the terminal when the voice information is sent by the terminal, the element information comprising an element identifier, element content information, position information of an element on the displayed page, and a version number of an application corresponding to the displayed page;
performing voice recognition on the voice information to acquire a voice recognition result, in response to determining the voice information being used for controlling the displayed page;
matching the voice recognition result with the element content information of the at least one element in the displayed page; and
generating page control information based on at least the element information in response to determining successfully matching the voice recognition result with the element content information of the at least one element, and sending the page control information to the terminal to allow the terminal to control the displayed page based on the page control information, the page control information comprising a click operation for the element with matched element content information in the displayed page, an element identifier of the element with the matched element content information and position information of the element with the matched element content information on the displayed page,
wherein the element information of the at least one element is stored in a tree structure in the terminal, and the matching the voice recognition result with the element content information of the at least one element comprises:
  traversing each subnode of the tree structure; and
  matching the element content information of the element represented by the each subnode and the voice recognition result.

7. The apparatus according to claim 6, wherein the matching the voice recognition result with the element content information of the at least one element comprises:
  calculating, for element content information of each element among the at least one element, a similarity between the voice recognition result and the element content information of the element, and determining successfully matching of the voice recognition result with the element based on the calculated similarity.

8. The apparatus according to claim 7, wherein the calculating a similarity between the voice recognition result and the element content information of the element, and determining successfully matching of the voice recognition result with the element based on the calculated similarity comprises:
  calculating a first edit distance between the voice recognition result and the element content information of the element;
  determining whether the first edit distance is greater than a preset first threshold; and
  determining the successfully matching the voice recognition result with the element content information of the element in response to determining the first edit distance being not greater than the first threshold.

9. The apparatus according to claim 8, wherein the calculating a similarity between the voice recognition result and the element content information of the element, and determining successfully matching of the voice recognition result with the element based on the calculated similarity further comprises:
  calculating a second edit distance between a pronunciation corresponding to the voice recognition result and a pronunciation corresponding to the element content information of the element in response to determining the first edit distance being greater than the first threshold;
  determining whether the second edit distance is greater than a preset second threshold;
  determining the successfully matching the voice recognition result with the element in response to determining the second edit distance being not greater than the second threshold; and
  determining unsuccessfully matching the voice recognition result with the element in response to determining the second edit distance being greater than the second threshold.

10. An apparatus for controlling a page, comprising:
at least one processor; and
a memory storing instructions, which when executed by the at least one processor, cause the at least one processor to perform operations, the operations comprising:
  sending, in response to receiving voice information from a user, the voice information and element information of at least one element in a displayed page simultaneously to a server, the displayed page being a page displayed on a screen of a terminal, the element information comprising an element identifier, element content information, position information of an element on the displayed page, and a version number of an application corresponding to the displayed page;
  receiving page control information from the server, the page control information being generated by the server based on at least the element information after the server determines the voice information being used for controlling the displayed page and a voice recognition result of the voice information matching the element content information of the at least one element, the page control information comprising a click operation for the element with matched element content information in the displayed page, an element identifier of the element with the matched element content information and position information of the element with the matched element content information on the displayed page; and
  determining a position of the element with the matched element content information on the displayed page based on the element identifier of the element with the matched element content information, and executing the click operation in the determined position and the position information of the element with the matched element content information,
  wherein the element information of the at least one element is stored in a tree structure in the terminal,
  wherein the server matches the voice recognition result with the element content information of the at least one element by:
    traversing each subnode of the tree structure; and
    matching the element content information of the element represented by the each subnode and the voice recognition result.

11. A computer readable storage medium storing a computer program, wherein the program, when executed by a processor, cause the processor to perform the method according to claim 1.

12. A computer readable storage medium storing a computer program, wherein the program, when executed by a processor, cause the processor to perform the method according to claim 5.

* * * * *

UNITED STATES PATENT AND TRADEMARK OFFICE
CERTIFICATE OF CORRECTION

| | |
|---|---|
| PATENT NO. | : 11,221,822 B2 |
| APPLICATION NO. | : 15/857025 |
| DATED | : January 11, 2022 |
| INVENTOR(S) | : Yan Zhang et al. |

It is certified that error appears in the above-identified patent and that said Letters Patent is hereby corrected as shown below:

On the Title Page

Item (73):
"BAIDU ONLINE NETWORK TECHNOLOGY (BEIJING) CO., LTD., Beijing (CN)"
Should read:
--BAIDU ONLINE NETWORK TECHNOLOGY (BEIJING) CO., LTD., Beijing (CN); SHANGHAI XIAODU TECHNOLOGY CO. LTD. Shanghai (CN)--.

Signed and Sealed this
Ninth Day of May, 2023

Katherine Kelly Vidal
*Director of the United States Patent and Trademark Office*